United States Patent [19]
Hamabe

[11] Patent Number: 5,752,192
[45] Date of Patent: May 12, 1998

[54] CHANNEL REUSE IN CELLULAR MOBILE COMMUNICATION WITH INTERFERENCE SIGNAL LEVELS OF DIFFERENT RADIO CHANNELS MEASURED AT REGULAR AND SHORTER REFRESH INTERVALS

[75] Inventor: Kojiro Hamabe, Tokyo, Japan

[73] Assignee: NEC Corporation, Tokyo, Japan

[21] Appl. No.: 567,773

[22] Filed: Dec. 5, 1995

[30] Foreign Application Priority Data

Dec. 5, 1994 [JP] Japan ................................ 6-300757

[51] Int. Cl.$^6$ ........................................... H04Q 7/26
[52] U.S. Cl. .................... 455/450; 455/452; 455/62; 455/63; 455/67.3
[58] Field of Search ........................... 455/33.1, 33.2, 455/33.4, 34.1, 34.2, 53.1, 54.1, 54.2, 56.1, 62, 63, 67.1, 67.3, 67.6, 422, 446, 447, 448, 450, 452, 454, 455; 379/59, 61

[56] References Cited

U.S. PATENT DOCUMENTS

| | | | |
|---|---|---|---|
| 4,736,453 | 4/1988 | Schloemer | 455/34.1 |
| 5,157,709 | 10/1992 | Ohteru | 455/63 |
| 5,179,722 | 1/1993 | Gunmar et al. | 455/56.1 |
| 5,475,864 | 12/1995 | Hamabe | 455/63 |
| 5,507,008 | 4/1996 | Kanai et al. | 455/34.1 |

FOREIGN PATENT DOCUMENTS 6-53901  2/1994  Japan .

OTHER PUBLICATIONS

Kanai, "Autonomous Reuse Partitioning in Cellular Systems", Vehicular Technology Society Forty–Second VTS Conference Frontiers of Technology, (1992), pp. 782–785.

Kubo, "Accuracy of Discrete Receiving Level Detection in Mobile Radio", Spring General Meeting of the Institute of Electronics, Information and Commun. Engineers. No. B–354, (1991), p. 2–354.

Shibutani et al., "Optical Fiber Feeder for Microcellular Mobile Communication Systems (H–015)", IEEE Journal of Selected Areas in Communications, vol. 11, No. 7, (1993), 1118–1126.

*Primary Examiner*—Reinhard J. Eisenzopf
*Assistant Examiner*—Thanh Le
*Attorney, Agent, or Firm*—Foley & Lardner

[57] ABSTRACT

In each cell of a mobile communication system with reuse of a plurality of radio channels by dynamic channel allocation, a base station repeats measuring an interference signal level of each channel of candidate channels during a predetermined interval for storage as a first stored level and then further during the interval for storage as a whole as a second stored level when the first stored level is lower than a predetermined reference level and selects, based on such stored levels, an allocated channel for communication with a mobile station in the cell. If the first stored level is lower than a lower reference level, further measurement is unnecessary. Alternatively, the base station repeats measurement and storage as regards different ones of the candidate channels at a regular and a shorter refresh interval. This invention is applicable to channel reuse in a microcellular mobile communication system with its central base station made to measure interference signal levels of different radio channels at regular and shorter refresh intervals.

19 Claims, 7 Drawing Sheets

CHANNEL REUSE IN CELLULAR MOBILE COMMUNICATION WITH INTERFERENCE SIGNAL LEVELS OF DIFFERENT RADIO CHANNELS MEASURED AT REGULAR AND SHORTER REFRESH INTERVALS

BACKGROUND OF THE INVENTION

This invention relates to a cellular mobile communication system, a base station used in the system, a microcellular mobile communication system, and a central base station used in the system.

A cellular mobile communication system has a service area divided into a plurality of cells and comprises base stations in respective cells. In each cell, the base station carries out communication with a mobile station through an allocated radio channel. The mobile station may be one of a plurality of mobile stations which are either standstill or moving in the cell. In general, a predetermined number of radio channels are assigned or allocated to the mobile communication system. Each of the radio channels is reused in different cells in order to raise efficiency of use of the radio channels and to insure allocation of the channels to a great number of mobile stations.

The radio channels are assigned in this manner to the mobile stations either by fixed channel allocation or dynamic channel allocation. In compliance with the fixed channel allocation, the radio channels are preliminarily assigned to the cells or to the base stations in consideration of interference between the channels allocated to neighboring cells. Each base station selects the allocated channel for each mobile station from the channels preliminarily assigned to the cell.

In compliance with the dynamic channel allocation, the radio channels are not assigned to individual cells. Instead, the base station measures, as a measured level, an interference signal level of each of the radio channels assigned to the system and selects as the allocated channel one of the radio channels that satisfies predetermined conditions such that the measured level is below a predetermined threshold level.

An example of the dynamic channel allocation is described in a paper contributed by Toshihiko Kanai to the Proceedings of IEEE Vehicular Technology Society, Forty-second VTS Conference (May 1992), pages 782 to 785, under the title of "Autonomous Reuse Partitioning in Cellular Systems". In this Kanai paper, the base stations select or sort the allocated channel out of the radio channels according to a common order to sort. When a plurality of mobile stations are alive in a cell, a channel of a higher order of select is adaptively selected for one of the mobile stations that is nearest to the base station. Such higher order channels are therefore reused in cells of a shorter cell distance to give a higher efficiency to use of the radio channels.

In connection with measurement of the interference signal level, a paper is submitted by Hidehiko Kubo and two others in the Japanese language to 1991 Spring General Meeting of the Institute of Electronics, Information and Communication Engineers of Japan as Paper No. B-354 under the title of "Accuracy of Discrete Receiving Level Detection in Mobile Radio" as translated by the contributors. According to this Kubo et al paper, the interference signal level is measured during a short interval of time discretely several times. This enables measurement as regards a certain number of radio channels in a common interval of time with a common precision and can achieve the dynamic channel allocation economically with a small number of measuring units.

A microcellular mobile communication system is described in a paper contributed by Makoto Shibutani and four others to the IEEE Journal on Selected Areas in Communications, volume 11, No. 7 (September 1993), pages 1118 to 1126, under the title of "Optical Fiber Feeder for Microcellular Mobile Communication Systems (H-015)". In such a system, each microcell has a diameter of several hundreds of meters to reuse the radio channels at a short cell distance and thereby to further raise the efficiency of use of the radio channels.

Another example of the cellular mobile communication system is disclosed in Japanese Patent Prepublication (A) No. 53,901 of 1994. In this system, the interference signal level is measured at the base stations in compliance with several measurement order tables. Each of the tables is used in common by those of the base stations which are spaced apart by a predetermined cell distance.

In the manner which will become clear as the description proceeds, the interference signal levels of a plurality of candidate radio channels are successively measured by a plurality of measuring units as measured levels. A storing unit is used to keep records of the measured levels as stored levels. On selecting the allocated channel from the candidate radio channels according to the dynamic channel allocation, the stored levels are referred to. It is important under the circumstances that the stored levels should have as small errors as possible. To this end, the measured levels must be precise. Moreover, the stored levels must be repeatedly refreshed at a short interval of time.

That is, measurement must have a high precision. One or more of the candidate radio channels may be newly used in other cells. Such an allocated channel may be released In the cell under consideration and in other cells from time to time. The interference signal level may become either strong or weak according to movement of the mobile station either in the cell in question or across the cells.

In propagation of each radio channel in the mobile communication system, it is known that a field intensity fluctuates when the mobile station travels only scores of meters. When measured at the base station, the interference signal level fluctuates with time at several Hz to a few scores of Hz. It is therefore general in practice to use as the measured level a median of fluctuations. Precision of the measured level is raised by lengthening the interval of time of the measurement. Whereas, a single measuring unit can measure only a limited number of the interference signal levels in a predetermined interval. A great number of measuring units are consequently indispensable.

For frequency refresh of the stored levels, more measuring units are necessary. Use of repeated measurement is useful in this connection as described in the Kubo et al paper.

In the microcellular mobile communication, the above-mentioned base station is much simplified in structure and operation and is called a microcell base station or is referred to as an antenna port. The microcell base stations are connected through transmission paths, such as optical fibers, to a central base station which may alternatively be called a base control station and is operable like the base station described above. In order to facilitate selection of the allocated channel, the central base station may comprise a traffic monitor for monitoring the transmission paths to detect a traffic value of the radio channels assigned to the system.

In conventional dynamic channel allocation schemes described in the foregoing, the interference signal levels should be measured in connection with a smallest possible number of the radio channels assigned to the system. This can raise precision of measurement and attain a reduction of the interval during which the interference signal levels are measured. No attention has been directed to a refresh interval of measurement of the interference signal levels. More specifically, the measurement has been refreshed at a common interval in connection with radio channels which have lower interference signal levels and are presumably adapted to allocation and which have high interference signal levels and are very likely busy. In other words, it has not been taken into account that the high interference signal levels can be measured with a low degree of precision because none of the radio channels with the high interference signal levels would be used as the allocated channel. These high interference signal levels have been measured with a common precision as the radio channels which have lower interference signal levels and may actually be used as the allocated channel. This has resulted in necessity of a large number of measuring units.

In addition, the error in measurement arises from the fluctuation in the interference signal level greater in connection with the radio channels usable as the allocated channel than as regards the radio channels which are hardly used as the allocated channel. This is because the busy channels may be released free to give lower interference signal levels in a predetermined interval with a higher degree of probability than a degree of probability that the radio channels are newly allocated to mobile stations in other cells to give higher interference signal level when the radio channels available as the allocated channel are small in number.

As for the microcellular mobile communication system, free or idle channels may be less in number in a particular microcell of the microcells than in near ones of the microcells. If the interference signal levels were measured at a long interval of time in each microcells, the free channels would be used in the near ones of the microcells before the free channels are found in the particular microcell. Even there is one of the busy channels that is released free during the long interval of time, this one of the radio channels may not be found free in the particular microcell. This results in a loss of call origination in the particular microcell. Furthermore, the radio channels are usually interswitched when a mobile station moves from one of the microcells to another and gives rise to forced cut off of one of the radio channels that is in use by the mobile station moving into the particular microcell from the near ones of the microcells. Such loss of the call and the forced cut off would be avoided if the long interval of time could be shortened. This, however, results in necessity of a large number of measuring units.

SUMMARY OF THE INVENTION

It is consequently an object of the present invention to provide a cellular mobile communication system in which the dynamic channel allocation is resorted to and in which each base station comprises a least possible number of measuring units, such as only one or two measuring units.

It is another object of this invention to provide a cellular mobile communication system which is of the type described and which gives a least possible probability to occurrence of loss of an originating call and of forced cut off of a busy radio channel.

It is still another object of this invention to provide a cellular mobile communication network which is of the type described and in which it is possible to measure an interference signal level with a high precision in connection with each radio channel available in actual use in transmitting a message including call origination.

It is yet another object of this invention to provide a microcellular mobile communication system which is of the type described above in connection with the cellular mobile communication system.

It is a different object of this invention to provide a base station for use in the cellular mobile communication system of the type described.

It is another different object of this invention to provide a central base station for use in the microcellular mobile communication system of the type described.

In connection with the objects described above, it should be noted that this invention is applicable to a mobile station which is for use in either a cellular or a microcellular mobile communication system of the type described.

In accordance with an aspect of this invention, there is provided a mobile communication system comprising a base station in each cell for communication with a mobile station in the cell through an allocated channel of a plurality of radio channels, which base station comprises measuring means for measuring an interference signal level of each channel as a measured level, storing means for storing the measured level as a stored level, and selecting means for selecting the allocated channel based on the stored level, wherein the measuring means is for measuring the interference signal level of one of the radio channels during a first predetermined interval as the measured level and for further measuring the interference signal level of this one of radio channels during a second predetermined interval when the stored level is lower than a predetermined reference level.

In accordance with this aspect of this invention, there is furthermore provided a base station which is for use in each cell of a mobile communication system in transmitting a message to a mobile station present in the cell through an allocated channel of a plurality of radio channels and which comprises measuring means for measuring an interference signal level of each channel as a measured level, storing means for storing the measured level as a stored level, and selecting means for selecting the allocated channel based on the stored level, wherein the measuring means is for measuring the interference signal level of one of the radio channels during a first predetermined interval as the measured level and for further measuring the interference signal level of this one of the radio channels during a second predetermined interval when the stored level is lower than a predetermined reference level.

In accordance with a different aspect of this invention, there is provided a mobile communication system comprising a base station in each cell for communication with a mobile station in the cell through an allocated channel of a plurality of radio channels, which base station comprises measuring means for measuring an interference signal level of each channel as a measured level, storing means for storing the measured level as a stored level, and selecting means for selecting the allocated channel based in the stored level, wherein the measuring means is for measuring the interference signal level at a refresh interval with the refresh Interval given a short interval when the stored level is lower than a predetermined reference level.

In accordance with the different aspect of this invention, there is furthermore provided a base station which is for use in each cell of a mobile communication system in transmitting a message to a mobile station present in the cell through an allocated channel of a plurality of radio channels and Which comprises measuring means for measuring an interference signal level of each channel as a measured level, storing means for storing the measured level as a stored level, and channel selecting means for selecting the allocated channel based on the stored level, wherein the measuring means is for measuring the interference signal level at a refresh interval with the refresh interval given a short interval when the stored level is lower than a predetermined reference level.

In accordance with a further different aspect of this invention, there is provided a mobile communication system comprising a central base station and a plurality of microcell base stations placed in respective microcells and connected to the central base station through transmission paths, one microcell base station in each microcell being for communication with a mobile station in each microcell under consideration through an allocated channel of a plurality of channels, wherein the central base station comprises: (A) regular measuring means for measuring an interference signal level of each radio channel as a measured level at a regular refresh interval; (B) storing means for storing the measured level as a stored level; (C) control means for calculating, in connection with each microcell base station, a channel count of free channels for each of which the stored level is lower than a predetermined reference level, and (D) additional measuring means for measuring the interference signal level of each radio channel additionally as the measured level at a short refresh interval shorter than the regular interval in connection with each less-count base station of the microcell base stations, the channel count of the less-count base station being less than a predetermined reference count; (E) the control means selecting the allocated channel based on the stored level which includes the stored level stored in response to the measured level measured additionally by the additional measuring means.

In accordance with the further different aspect of this invention, there is furthermore provided a central base station for use in a mobile communication system comprising a plurality of microcell base stations placed in respective microcells and connected to the central base station through transmission paths, one microcell base station in each microcell being for communication with a mobile station in the above-mentioned each microcell through an allocated channel of a plurality of radio channels, wherein the control base station comprises: (A) regular measuring means for measuring an interference signal level of each radio channel as a measured level at a regular refresh interval; (B) storing means for storing the measured level as a stored level, (C) control means for calculating, in connection with each microcell base station, a channel count of free channels for each of which the stored level is lower than a predetermined reference levels and (D) additional measuring means for measuring the interference signal level of each radio channel additionally as the measured level at a short refresh interval shorter than the regular interval in connection with each less-count base station of the microcell base stations, the channel count of the less-count base station being less than a predetermined reference count; (E) the control means selecting the allocated channel based on the stored level which includes the stored level stored in response to the measured level measured additionally by the additional measuring means.

In accordance with a still further different aspect of this invention, there is provided a mobile communication system comprising a central base station and a plurality of microcell base stations placed in respective microcells and connected to the central base station through transmission paths, one microcell base station in each microcell being for communication with a mobile station in the above-mentioned each microcell through an allocated channel of a plurality of radio channels, wherein the central base station comprises: (A) regular measuring means for measuring an interference signal level of each radio channel as a measured level at a regular refresh interval; (B) storing means for storing the measured level as a stored level; (C) control means for calculating, in connection with each microcell base station, a channel count of free channels, for each of which the stored level is lower than a predetermined reference level, a traffic value of the radio channels, and a traffic ratio of the channel count to the traffic value; and (D) additional measuring means for measuring the interference signal level of each radio channel additionally as the measured level at a short refresh interval shorter than the regular refresh interval in connection with each less-ratio base station of the microcell base stations, the traffic ratio of the less-ratio base station being less than a predetermined reference ratio; (E) the control means selecting the allocated channel based on the stored level which includes the stored level stored in response to the measured level measured additionally by the additional measuring means.

In accordance with the still further different aspect of this invention, there is furthermore provided a central base station for use in a mobile communication system comprising a plurality of microcell base stations placed in respective microcells and connected to the central base station through transmission paths, one microcell base station in each microcell being for communication with a mobile station in each microcell in question through an allocated channel of a plurality of radio channels, wherein the central base station comprises: (A) regular measuring means for measuring an interference signal level of each radio channel as a measured level at a regular refresh interval; (B) storing means for storing the measured level as a stored level; (C) control means for calculating, in connection with each microcell base station, a channel count of free channels, for each of which the stored level is lower than a predetermined reference level, a traffic value of the radio channels, and a traffic ratio of the channel count to the traffic value; and (D) additional measuring means for measuring the interference signal level of each radio channel additionally as the measured level at a short refresh interval shorter than the regular refresh interval in connection with each less-ratio base station of the microcell base stations, the traffic ratio of the less-ratio base station being less than a predetermined reference ratio; (E) the control means selecting the allocated channel based on the stored level which included the stored level stored in response to the measured level measured additionally by the additional measuring means.

DESCRIPTION OF THE PREFERRED EMBODIMENTS

Figure 1:
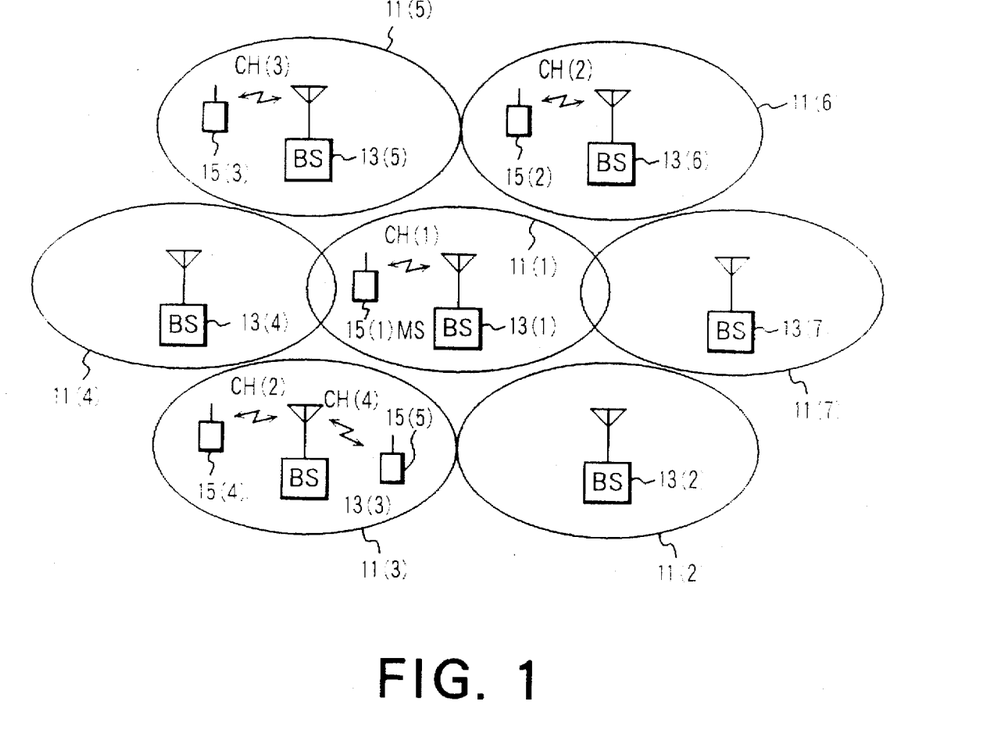
FIG. 1 is a schematic representation of a cellular mobile communication system in general.

Referring to FIG. 1, a cellular mobile communication system has in general a service area which is divided into a plurality of cells 11. In the example being illustrated, the service area comprises first through seventh cells 11(1), 11(2), 11(3), 11(4), 11(5), 11(6), and 11(7). In these cells, first through seventh base stations (BS) 13 or 13(1), 13(2), 13(3), 13(4), 13(5), 13(6), and 13(7) are placed, respectively. First through N-th radio channels CH(1) to CH(N) are assigned or allocated to the mobile communication system, where N represents a predetermined integer. Usually, a great number of mobile stations (MS) 15 are used in the mobile communication system. Some of the mobile stations 15 are alive or active and are moving either in the cells 11 or from one to another of the cells 11. At a certain time instant, a first mobile station 15(1) is in the first cell 11(1), a second mobile station 15(2) is in the sixth cell 11(6), a third mobile station 15(3) is in the fifth cell 11(5), and fourth and fifth mobile stations 15(4) and 15(5) are in the third cell 11(3).

In the manner which is known in the art and will become clear as the description proceeds, each base station 13 allocates one of the radio channels CH(1) to CH(N) with reuse as an allocated channel to communication with one of the mobile stations 15 that is currently in the cell 11 related to the base station 13 under consideration. In this manner, the first radio channel CH(1) is allocated by the first base station 13(1) to communication with the first mobile station 15(1). The second radio channel CH(2) is allocated by the sixth base station 13(6) to communication with the second mobile station 15(2) and is reused by the third base station 13(3) for communication with the fourth mobile station 15(4). The third radio channels CH(3) is allocated by the fifth base station 13(5) to communication with the third mobile station 15(3). The fourth radio channel CH(4) is allocated by the second base station 13(2) to communication with the fifth mobile station 15(5).

Such a cellular mobile communication system is known in the art and will not be described in greater detail except for the manner of allocation of the radio channels CH(1) to CH(N). On allocating one of the radio channels CH(1) to CH(N) to a mobile station 15, each base station 13 measures an interference signal level of each of the radio channels CH(1) to CH(N). It will now be presumed in the manner depicted that the first base station 13(1) is exchanging messages with the first mobile station 15(1) through the first radio channel CH(1). When measured at each of nearby base stations, such as 13(2) to 13(7), the interference signal level of the first radio channel CH(1) is high. When the communication between the first base station 13(1) and the first mobile station 15(1) comes to an end, the first radio channel CH(1) is released and becomes a free or idle channel. In this event, the interference signal level of the first radio channel CH(1) is low. It is now possible for each of the nearby base stations to use the first radio channel CH(1) as the allocated channel.

Figure 2:
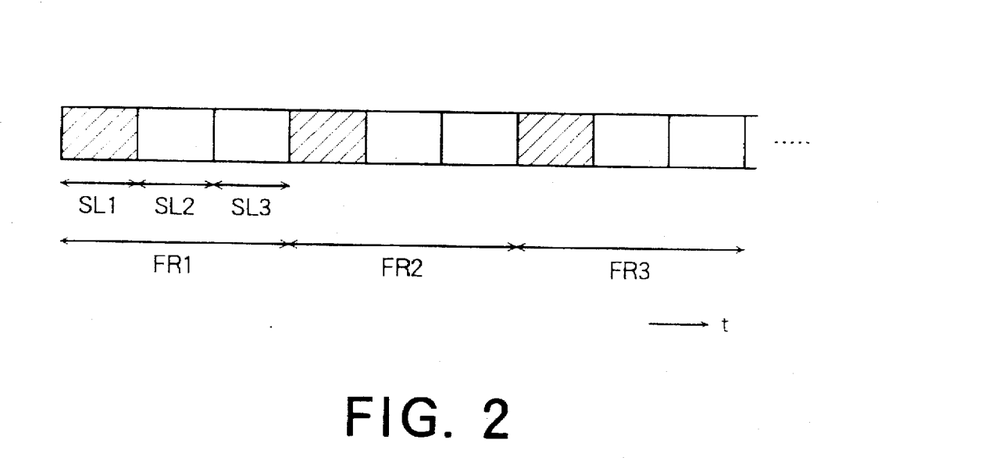
FIG. 2 schematically shows a radio signal used in the cellular mobile communication system depicted in FIG. 1.

Turning to FIG. 2 with FIG. 1 continuously referred to, a radio signal of each radio channel CH(n) is depicted with a time axis t indicated horizontally of the figure, where n represents one of 1 through N, both inclusive, as a channel identification number. First through third frames FR1, FR2, and FR3 are illustrated. For measurement of the interference signal level by a measuring unit (later shown), each frame is divided into a plurality of time slots in the manner indicated by vertical lines in the frames. At each base station 13, the interference signal level of this n-th channel CH(n) is measured at a predetermined time slot in each of a certain number of frames, such as the time slots indicated by hatches, during a predetermined time interval. In other time slots, the interference signal level of other radio channels are measured. In the example being illustrated, each frame is divided into first through third time slots SL1, SL2, and SL3. The measuring unit is therefore used in measuring the interference signal level of three of the radio channels CH(1) to CH(N) cyclically during the predetermined time interval.

Figure 3:
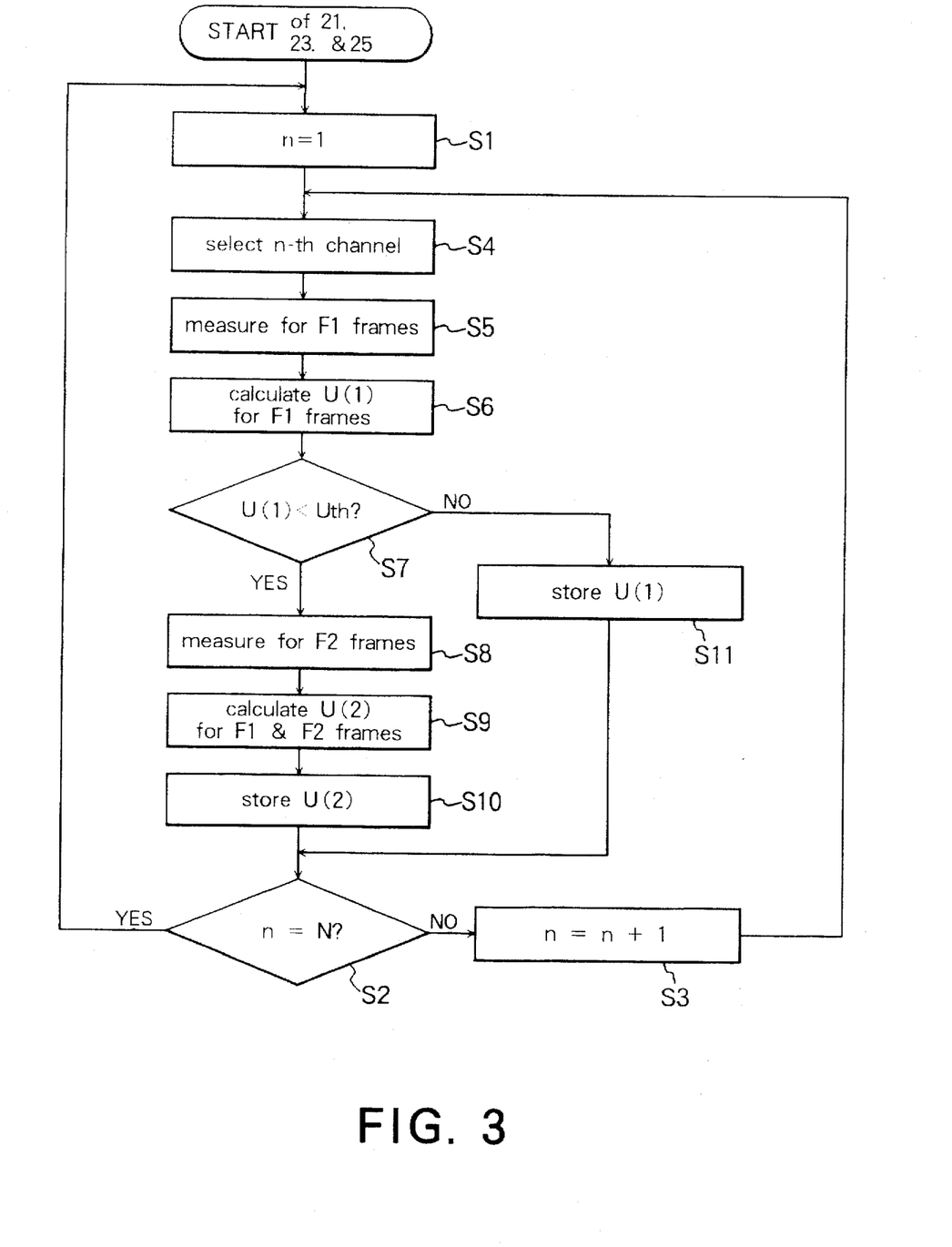
FIG. 3 shows a flow chart for use in describing operation of a base station which is illustrated in FIG. 1 and is according to a first embodiment of the instant invention.

Referring to FIG. 3 with FIGS. 1 and 2 continuously referred to, the measuring unit is operable as follows in the base station 13 according to a first preferred embodiment of this invention. It may be mentioned here as will presently be illustrated that each base station 33 comprises a measured level memory and a radio channel selector besides the measuring unit. After start of the measuring unit, the measured level memory, and the channel selector, it will be surmised for the time being that the measuring unit is used in measuring the interference signal level of each of the radio channels CH(1) to CH(N) cyclically from the first radio channel (n=1) up to the N-th radio channel (n=N) in the manner indicated at first through third steps S1, S2, and S3. At the first step, the channel selector selects the first radio channel. At the second step, the channel selector checks whether or not the N-th radio channel is released. If an N-th radio channel is not yet selected, the channel selector selects, as the third step, one of the radio channels that has a channel number incremented by one. If the N-th radio channel is already processed, the channel selector again selects the first radio channel at the first step.

In the manner depicted in the figure, the channel selector selects the n-th radio channel at a fourth step S4. At a fifth step S5, the measuring unit measures the interference signal level of the n-th radio channel as measured levels in connection with a first predetermined number F1 of the frames. In the meanwhile, the measuring unit calculates a first median of the measured levels as a first measured level U(1) as indicated at a sixth step S6. At a seventh step S7, the measuring unit compares the first measured level with a predetermined reference or threshold level Uth.

If the first measured level is lower at the seventh step S7 than the predetermined level, the measuring unit continues measurement, at an eighth step S8, of the interference signal level of the n-th radio channel as regards a second predetermined number F2 of the frames. In the meantime, the measuring unit calculates, as a second measured level U(2) at a ninth step S9, a median of levels measured in connection with the first and the second frames. Prior to the seventh step, a stored level may be stored in the measured level memory. At a tenth step S10, the measuring unit refreshes or renews the stored level to the second measured level. If the first measured level is not lower than the predetermined reference level at the seventh step, the measuring unit refreshes at an eleventh step S11 the stored level to the first measured level.

The predetermined reference level is decided as follows. It is usual that a plurality of mobile stations 15 are alive in the cell 11 in which the base station 13 under consideration is present. Depending on effective distances between the base station 13 and such mobile stations 15, desired signal levels are different. In consideration of a distribution of the desired signal levels, the predetermined reference level is decided with addition of a margin for measurement errors by a maximum interference signal level allowable on assigning the allocated channel to each of the mobile stations in question. For example, the predetermined reference level is selected to be equal to a quotient of a maximum value of the desired signal levels by a desired power to interference power ratio which is necessary for channel allocation.

In FIG. 3, it Is possible for the base station 13 to proceed from the seventh step S7 to the eighth step S8 when the first measured level is lower than the predetermined reference level and is not higher than a lower reference level. In this event, the seventh step proceeds to the eleventh step S11 when the first measured level is not lower than the predetermined reference level and is higher than the lower reference level.

The lower reference level is predetermined, with attention directed to the distribution of desired signal levels, by a low interference signal level which can be neglected on assigning the allocated channel. For example, the lower reference level is decided to be equal to a quotient of a minimum value of the desired signal level by the desired power to interference power ratio.

The first measured level may have a low degree of precision. When the interference signal level is higher than the predetermined reference level, the radio channel is seldom selected as the allocated channel. It is therefore possible by measuring the interference signal level further for the second predetermined number of frames, namely, during a total interval of the first and the second numbers of frames, to raise the precision of measurement of the interference signal level as regards each of candidate radio channels that is more likely used as the allocated channel.

For a cellular mobile communication system in which the radio channels CH(1) to CH(N) are assigned with reuse to a great number of mobile stations 15, the first measured level would exceed the predetermined reference level in connection with a considerable number of radio channels CH(1) to CH(N). It is consequently possible to get the second measured level as regards only a limited number of radio channels.

It is to be noted that a certain one of the radio channels CH(1) to CH(N) is available for the channel allocation when this one of the radio channels has the first measured level lower than the lower reference level. Inasmuch as the interference signal level is sufficiently low, operation of the channel allocation is hardly adversely affected even when the first measured level has a low degree of precision. It is therefore possible to shorten the time interval for measurement of the interference signal level by omitting the eighth through the tenth steps S8 to S10. It may be necessary to use a plurality of measuring units when the radio channels CH(1) to CH(N) are not only three channels in the manner exemplified in conjunction with FIG. 2 but are great in number. Even in this event, a short measuring time interval, such as for only the frames of the first predetermined number F1, enables use of a small number of measuring units.

In this manner, it is possible with the base station 13 being illustrated to repeatedly measure the interference signal level of the n-th radio channel at a shorter interval of repetition or refresh by a limited number of measuring units. This makes it possible to raise a degree of precision of the stored levels and to achieve a desired degree of precision with a smaller number of measuring units.

Figure 4:
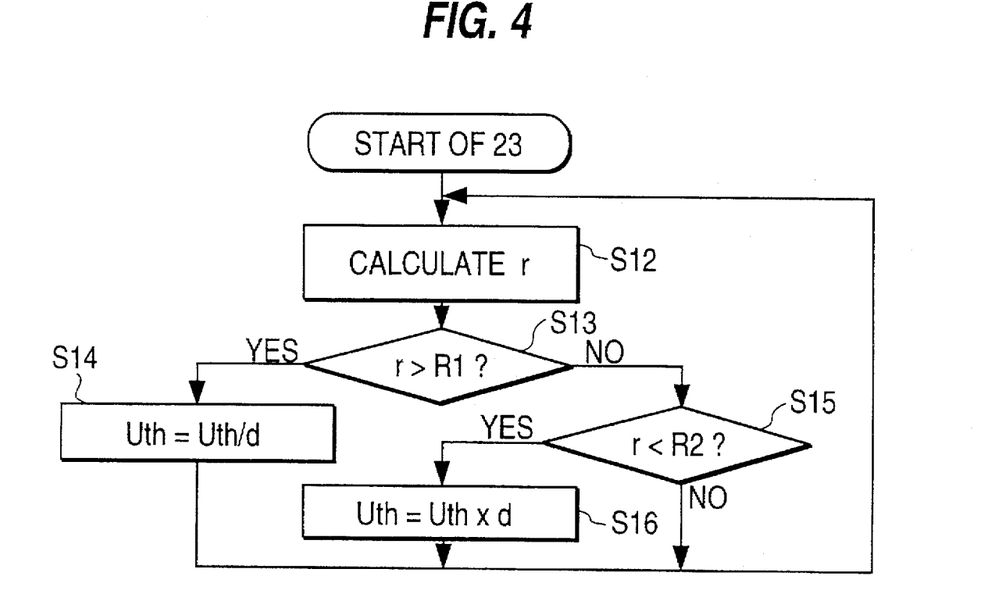
FIG. 4 shows a flow chart for use in describing operation of a base station which is depicted in FIG. 1 and is according to a second embodiment of this invention.

Turning to FIG. 4 with FIGS. 1 and 2 continuously referred to, a base station 13 is operable as follows according to a second preferred embodiment of this invention. In this operation, the predetermined reference level is varied or either increased or decreased for use in the seventh step S7 of FIG. 3 so that a channel count of the number of radio channels may be in a predetermined range. The measuring unit therefore comprises a channel counter for measuring the channel count. Such operation will be described hereafter with steps of the operation numbered following the steps following those already described.

Instead of the eighth step S8 described in conjunction with FIG. 3, the channel counter calculates at a twelfth step S12 a number ratio r, to the predetermined integer N, of those radio channels which are herein called first channels and for each of which the measured level, such as the first measured level U(1), is lower than the predetermined reference level. As a thirteenth step S13, the channel counter compares the number ratio with a first predetermined ratio R1.

If the number ratio is greater at the thirteenth step than the first predetermined ratio, the channel counter decrements the first predetermined ratio, the channel counter increments at a fourteenth step S14 the predetermined reference level Uth by a predetermined factor d. The fourteenth step returns to the twelfth step. If the number ratio is not greater than the first predetermined ratio, the channel counter compares at a fifteenth step S15 the number ratio with a second predetermined ratio R2 which is smaller than the first predetermined ratio. If the number ratio is less than the second predetermined ratio, the channel counter decrements the predetermined reference count by the predetermined factor at a sixteenth step S16, which returns to the twelfth step. Otherwise, the fifteenth step returns to the twelfth step.

In the base station 13 operable as described with reference to FIGS. 3 and 4, the interference signal level is adaptively measured during the total interval as regards only those of the radio channels CH(1) to CH(N) which are limited in number by the first and the second predetermined ratios. This makes it possible to optionally decide the predetermined reference level and to prevent the precision of measurement of the interference signal level from decreasing in connection with the limited number of the radio channels CH(1) to CH(N) regardless of fluctuation in time of the interference signal level.

Reviewing FIGS. 2 through 4, it may be pointed out that each base station 13 comprises a receiver unit for receiving communications from the mobile stations 15 which are currently alive in the cell 11 of the base station 13. It is possible to measure the interference signal level during free or idle time slots where the receiving unit receives no communication.

Referring afresh to FIG. 5 and again to FIG. 1, the description will proceed to a base station 13 according to a third preferred embodiment of this invention. The base station 13 comprises first and second queue units 17 and 19, a channel selector 21, first and second measuring units 23 or 23(1) and 23(2), a recorder 25, and a channel selection controller 27. One or both of the first and the second measuring units correspond to the measuring unit described before. The recording unit 25 corresponds to the measured level memory. The channel selector 21 corresponds to the radio channel selector.

Figure 5:
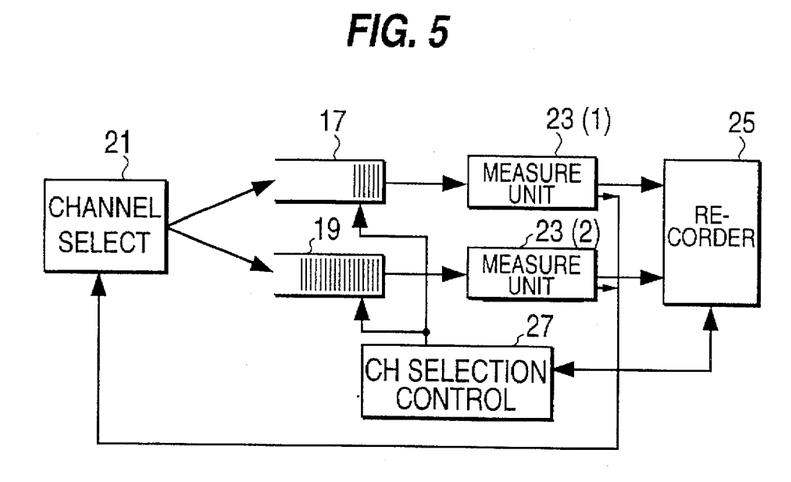
FIG. 5 Is a block diagram of a base station which is illustrated in FIG. 1 and is according to a third embodiment of this invention.

The first and the second queue units 17 and 19 are for administrating in cooperation an order of measurement of the interference signal level in connection with each of the radio channels CH(1) to CH(N). The channel selector 21 selects a selected channel from the radio channels administrated by the first and the second queue units 17 and 19. Selected from the first and the second queue units 17 and 19, such selected channels are delivered to the first and the second measuring units 23 for measurement of the interference signal levels of the respective selected channels for storage in the recorder 25 as stored levels. Except for an interval of measurement of the interference signal levels, the radio channels CH(1) to CH(N) are in one and the other of queues of queued channels in the first and the second queue units 17 and 19. Immediately after measurement of the interference signal levels, the first and the second measuring units 23 inform the channel selector 21 of this fact. Based on the stored levels, the channel selection controller 27 selects the allocated channel. In the example being illustrated, it will be presumed that the first and the second queue units 17 and 19 are for the radio channels of which the interference signal levels are measured at a longer and a shorter refresh interval, respectively.

Figure 6:
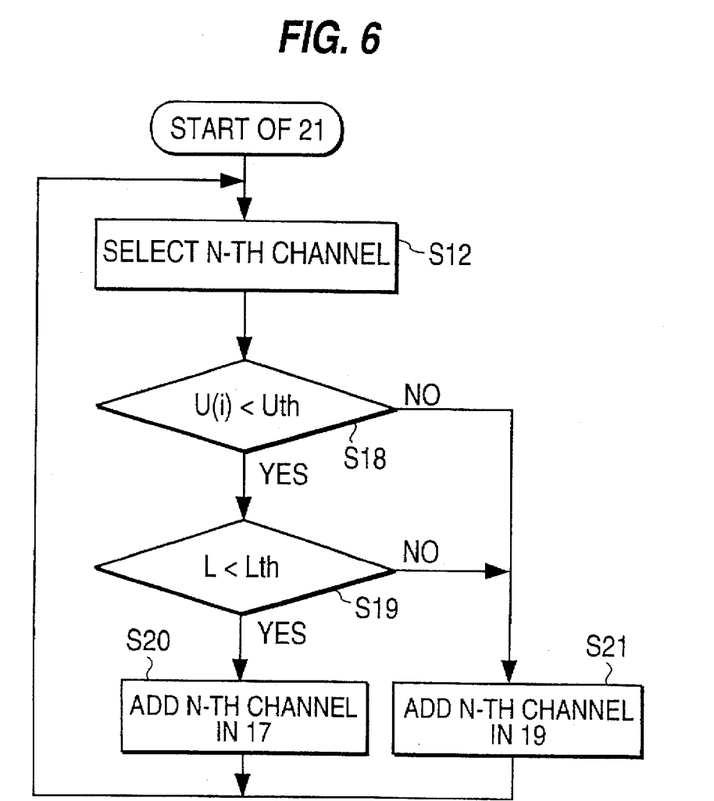
FIG. 6 shows a flow chart for use in describing operation of the base station mentioned in connection with FIG. 5.

Turning to FIG. 6 with FIGS. 1 and 5 continuously referred to, the base station 13 is operable as follows after start of operation of the channel selector 21. At a seventeenth step S17 which corresponds to the fourth step S4 described in connection with FIG. 3, the channel selector 21 specifies the n-th radio channel and selects one of the first and the second queue units 17 and 19 that currently holds the n-th radio channel at a head of the queue. Supplied with the n-th radio channel at an eighteenth step S18, the first or the second measuring unit 23 checks like in the seventh step S7 of FIG. 3 whether or not the first measured level U(1) is lower than the predetermined reference level Uth.

If the first measured level is lower than the predetermined reference level, the first measuring unit 23(1) calculates at a nineteenth step S19 a channel count L of those of the radio channels, which remain in the queue administrated by the first queue unit 17, and checks whether or not the channel count is less than a predetermined reference count Lth. If the channel count is less than the predetermined reference count, the first measuring unit 23(1) stores the n-th radio channel at a trailing end of the queue back in the first queue unit 17 at a twentieth step S20. It is possible to understand that the channel selection controller 27 refers to the recorder 27 for the first measured level and deals with the eighteenth through the twentieth steps. Either if the first measured level is not less than the predetermined reference level or if the channel count is not less than the predetermined reference count, the channel selection controller 27 adds the n-th radio channel to a trailing end of the queue administrated by the second queue unit 19 at a twenty-first step S21. The twentieth and the twenty-first steps return back to the seventeenth step.

When a call originates either in the base station 13 or one of the mobile stations 15 that is currently present in the cell 11 of the base station 13 in question, the channel selection controller 27 selects the allocated channel and cancels the allocated channel from the queue in the first or the second queue unit 17 or 19. As soon as the allocated channel is released to become a free channel, the channel selecting unit 27 adds this free channel at a leading end of the queue in either of the first and the second queue units 17 and 19. It is alternatively possible to understand the channel selector 21 as the channel selection controller 27 to select one of the first and the second measuring units 23.

Further turning to FIG. 7 with FIGS. 1 and 5 continuously referred to, the channel selector 21 may be operable as follows. It is noted In this connection that the number of queued channels is variable with time in the first queue unit 17 as a result of the twentieth and the twenty-first steps S20 and S21 described with reference to FIG. 6. At a twenty-second step S22 of FIG. 7, the channel selector 21 calculates in a prescribed time interval an average Lav of the numbers of queued channels held in the first queue unit 17. The channel selector 21 checks at a twenty-third step S23 whether or not the average is less than an upper limit Lmax. If the average is less than the upper limit, the channel selector 21 decrements at a twenty-fourth step S24 for the first measuring unit 23(1) the predetermined reference level by the above-mentioned predetermined factor d. If the average is not less than the upper limit, the channel selector 21 checks at a twenty-fifth step S25 whether or not the average is less than a lower limit Lmin. If the average is less than the lower limit, the channel selector 21 increments the predetermined reference count by the predetermined factor d at a twenty-sixth step S26. The twenty-fourth and the twenty-sixth steps and, if the average is not less than the lower limit, the twenty-fifth step return back to the twenty-second step. In this manner, the number of queued channels is kept in a predetermined range in the first queue unit 17 for measurement of the interference signal level by the first measuring unit 23(1).

In FIG. 6, the interference signal level is measured at the shorter refresh interval by the first measuring unit 23(1) in connection with the queued channels which are held by the first queue unit 17 and are often selected as the allocated channel. The short refresh interval reduces the measurement error. In contrast, the queued channels of the second queue unit 19 have higher interference signal levels which are measured at the longer refresh interval. These queued channels are scarcely selected as the allocated channel. As a consequence, it is possible to raise the precision of measurement, It is moreover possible to lengthen both the shorter and the longer refresh intervals and to use a smaller number of measuring units to achieve a certain degree of precision.

Use of the channel count L restricts the number of queued channels in the first queue unit 17 below a certain channel count. This enables a shorter refresh interval for the first measuring unit 23(1) to further raise the precision of measurement.

It should, however, be noted that the short refresh interval would become long if the number of queued channels is greater than a certain integer in the first queue unit 17. This nevertheless means that there are many queued channels to comply immediately with a request for channel allocation.

The predetermined reference level influences a ratio of the number of queued channels in the first queue unit to the number of queued channels in the second queue unit 19. When the predetermined reference value is too great, the short refresh interval would become objectionably long. When the predetermined reference level is too small, the first measuring unit 23(1) measures the interference signal levels at an interval of time which is shorter than necessary. In correspondence, the second measuring unit 23(2) measures the interference signal levels at a long interval of time.

Figure 7:
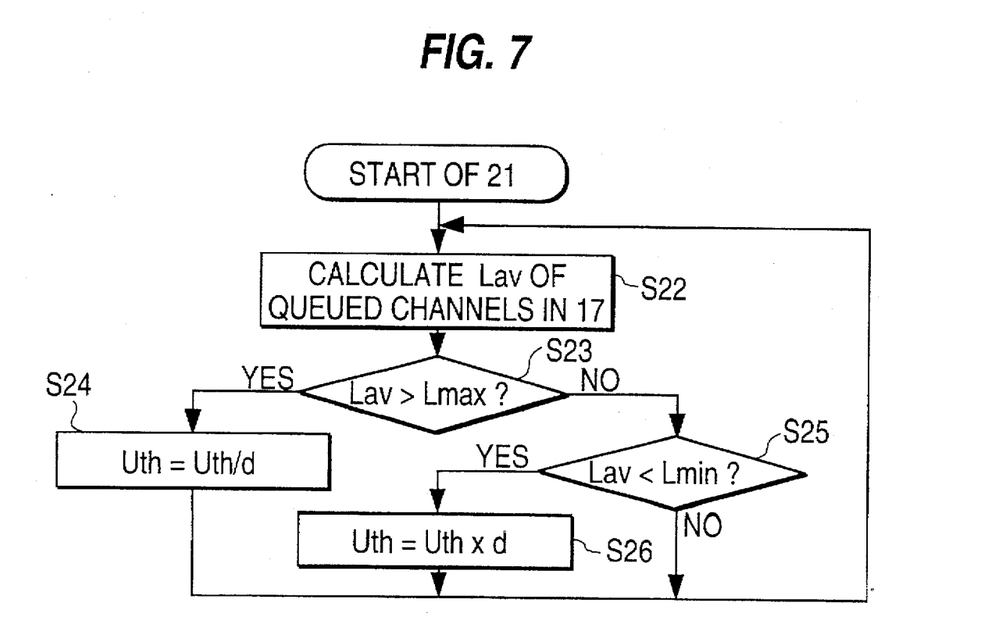
FIG. 7 shows another flow chart for use in describing operation of the base station mentioned in connection with FIG. 5.

In FIG. 7, such disadvantages are avoided. When the predetermined reference level is incremented, the queued channels become greater in number in the first queue unit 17.

This results in a decrease of the number in question and to shorten the short refresh interval. When the predetermined reference level is decremented, the number of queued channels becomes smaller in the first queue unit 17. This results in an increase in the last-mentioned number to a certain degree and prevents the refresh interval from becoming shorter than necessary. As a consequence, it is possible to keep the channel count of the queued channels in the first queue unit 17 to decide the short refresh interval as desired.

In FIGS. 6 and 7, it is objectionable to assign the allocated channel to communication between the base station 13 and another of the mobile stations 15 currently present in the cell 11 for the base station 13 under consideration. It is preferred therefore to omit such allocated channels from an object for measurement of the interference signal level or levels. This shortens the shorter refresh interval and reduces the number of the measuring units 23 for a predetermined length of the short refresh interval.

When an allocated channel is released into a free channel, this free channel is very likely a candidate channel available for the channel allocation. The free channel is therefore placed at the leading end in the first queue unit 17 for immediate confirmation by the first measuring unit 23(1) as regards the interference signal level. This enables the base station 13 to cope at a higher degree of probability with channel requests which may be crowded within a short interval of time.

Each of the measuring units 23 may continuously measure the interference signal level of an individual one of the radio channels CH(1) to CH(N) during a certain interval of time. Alternatively, each measuring unit 23 may discretely and repeatedly measure the interference signal levels of the queued channels from the leading end towards the trailing end. In this event, the queue units 17 and 19 and the measuring units 23 are operable in response to the n-th radio channel indicated by the channel selector 21.

Figure 8:
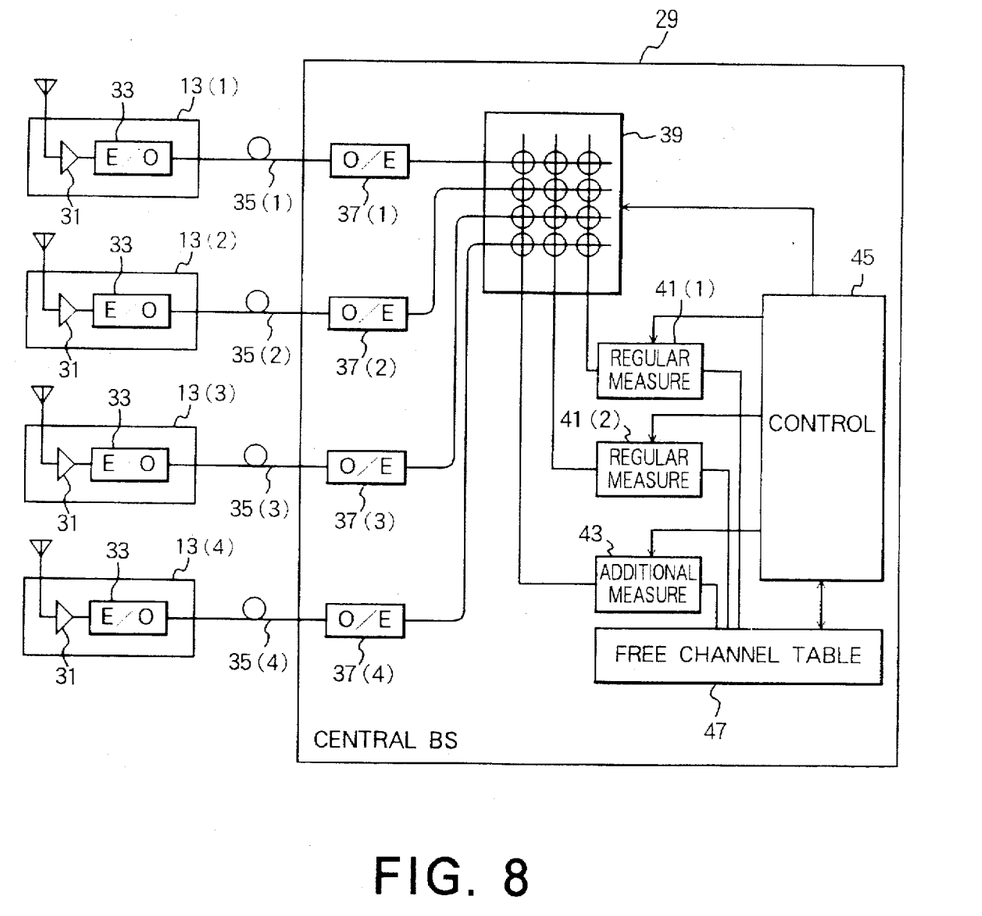
FIG. 8 shows in blocks a central base station according to a fourth embodiment of this invention together with several microcell base stations.

Referring now to FIG. 8 in addition to FIG. 1, attention will be directed to a microcellular mobile communication system which comprises a central base station (CENTRAL BS) 29 according to a fourth preferred embodiment of this invention. In FIG. 1, the cells 11 are now microcells. The base stations 15 are microcell base stations exemplified also in FIG. 8 as first through fourth microcell base stations (MICRO BS) 23(1) to 13(4).

Each microcell base station 13 comprises an amplifier 31 for amplifying into an amplified signal a radio signal which reaches an antenna from the mobile station or stations which are present in the microcell 11 of each microcell base station 13 in question. An electro-optic converter (E/0) 33 is for conversion from the amplified signal into an upward optical signal for delivery to a pertinent one of first through fourth transmission paths or optical fibers 35 or 35(1), 35(2), 35(3), and 35(4).

The central base station 19 comprises first through fourth opto-electric converters (O/E) 37 or 37(1), 37(2), 37(3), and 37(4) connected to the first through the fourth optical fibers 35, respectively. Through an exchange switch 39, the first through the fourth opto-electric converters 37 are connected to first and second regular measuring units 41 or 41(1) and 41(2) and to an additional measuring unit 43. A control unit 45 controls the exchange switch 39 and the regular and the additional measuring units 41 and 43. The control unit 45 comprises the recorder 25 described in conjunction with FIG. 5 to serve as a storing unit. A free or idle channel table 47 is connected to the regular and the additional measuring units 41 and 43 and to the control unit 45. The regular measuring units 41 are for measuring the interference signal levels of the radio channels CH(1) to CH(N) at a regular refresh interval in connection with those of the microcell base stations 13 at which a channel count of free channels available as the allocated channel is not less than a predetermined reference count. The additional measuring unit 43 is for measuring the interference signal level of the radio channels at a short refresh interval shorter than the regular refresh interval in connection with those others of the microcell base stations 15 at which the channel count is less than the predetermined reference count.

Figure 9:
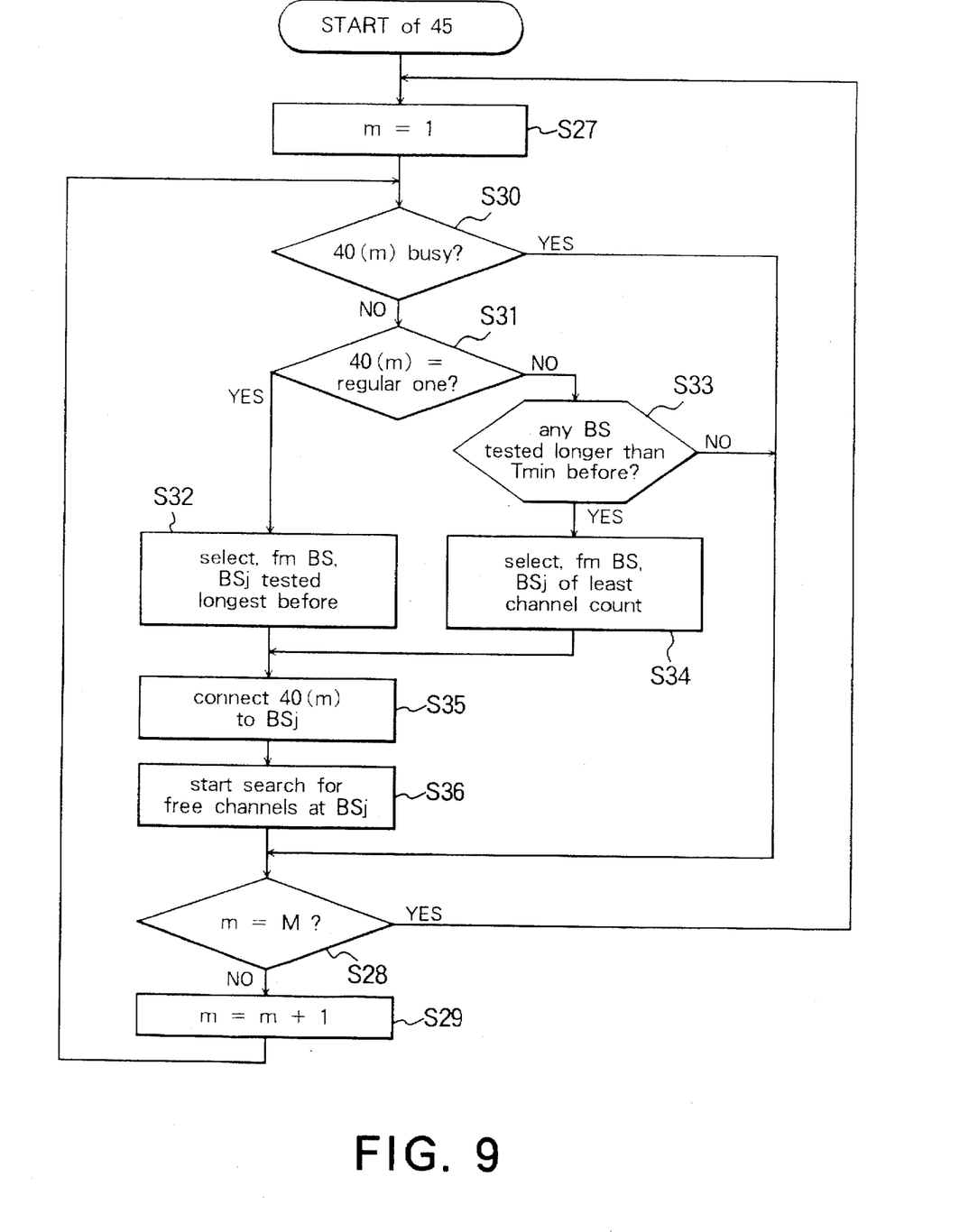
FIG. 9 shows a flow chart for use in describing operation of the central base station illustrated in FIG. 8.

Turning to Fig. 9 with FIGS. 1 and 8 continuously referred to, the central base station 29 and the microcellular base stations 13 are operable as follows on selecting an allocated channel from the first through the N-th radio channels CH(1) to CH(N) for use between each microcellular base station 13 and one of the mobile stations 15 that is currently present in the microcell 11 of the microcell base station 13 under consideration. Broadly speaking, the regular and the additional measuring units 41 ad 43 are used in repeatedly searching for free or idle channels in cooperation with the microcellular base stations. These measuring units 41 and 43 will be referred to serially as first through M-th measuring units 40 or 40(1) to 40(M). Each of the measuring units 40 will be called an m-th measuring unit 40(m), where m represents a unit identification number variable between 1 and M, both inclusive.

The control unit 45 cyclically specifies the measuring units 40 from the first measuring unit (m=1) up to the M-th measuring unit (m=M) at twenty-seventh through twenty-ninth steps S27, S28, and S29 which are similar to the first through the third steps S1 to S3 described in conjunction with FIG. 3. At a thirtieth step S30, the control unit 45 specifies the M-th measuring unit 40(m) and checks whether or not the m-th measuring unit 40(m) is searching for the free channels.

Before the m-th measuring unit 40(m) actually starts to search for the free channels, the control unit 45 selects a selected station BSj of the microcellular base stations 13 in the manner which will presently become clear. Having decided the selected station BSj, the control unit 45 controls the switch 39 to establish connection of the m-th measuring unit 40(m) to the selected station BSj. The m-th measuring unit 40(m) starts to detect whether or not a free or idle channel is present among the radio channels CH(1) to CH(N) by measuring the interference signal levels. If one of the radio channels is found to have the interference signal level lower than the predetermined reference level of the type described before, this one of the radio channels is decided as the free channel. The control unit 45 stores a record of the selected station BSj and of the free channel or channels in the free channel table 47.

Actual search for the free channels comes in due course to an end at the m-th measuring unit 40(m). It is now possible for the control unit 45 to assign the free channel or one of the free channels as the allocated channel to one of the mobile stations 15 which are currently present in the microcell 11 of the selected station BSj and having originated a call. When the allocated channel is thus assigned to the mobile station 15 under consideration, the control unit 45 cancels the allocated channel from the record of the free channel table 47. When the control unit 45 again takes the selected station BSj into consideration while later specifying either the same one or a different one of the measuring units 40, this one of the measuring units 40 starts to afresh search for the free channels. In response, the control unit 45 refreshes or renews the record In the free channel table 47.

If the m-th measuring unit 40(m) is not at the thirtieth step in search for the free channels, the control unit 45 checks at a thirty-first step S31 whether the m-th measuring unit 40(m) is the regular measuring unit 41 or the additional measuring unit 43. If the m-th measuring unit 40(m) is one of the first and the second measuring units 41, the control unit 45 selects at a thirty-second step S32 one of the microcellular base stations 13 as the selected station BSj, in connection with which the record is refreshed in the free channel table 47 earliest among the microcellular base stations 13. If the m-th measuring unit 40(m) is the additional measuring unit 43, the control unit 45 checks at a thirty-third step S33 whether or not there is at least one of the microcellular base stations 13, in connection with which the record was latest refreshed in the free channel table 47 longer than a predetermined short refresh interval of time Tmin before.

When two or more microcellular base stations 13 ate found at the thirty-third step, the control unit 45 calculates in connection with each of these microcellular base stations 13 a channel count of the free channels and decides at a thirty-fourth step S34 one of these microcellular base stations 13 as the selected station BSj for which the channel count is least. When only one microcellular base station 13 is found at the thirty-third step, the control unit 45 decides this one of the microcellular base stations 13 as the selected station BSj at the thirty-fourth step. It will readily be understood that the control unit 45 can preliminarily store such a channel count in the free channel table 47 before storing the free channels successively in the free channel table 47.

Having so decided the selected station BSj, the control unit 45 establishes at a thirty-fifth step S35 the connection described above. At a thirty-sixth step S36, the control unit 45 starts detection of the free channel or channels as described before by the m-th measuring unit 40(m) which may be whichever of the regular and the additional measuring units 40 or 41 and 43.

After start of the detection at the thirty-sixth step, the control unit 45 checks at the twenty-eighth step whether or not the unit identification number m is equal to M. If no microcellular base station 13 is found at the thirty-third step, the control unit 45 starts check of m at the twenty-eighth step. If the unit identification number is equal to M, the control unit 45 repeats the twenty-seventh step, the thirtieth through either the thirty-third or the thirty-sixth steps, and the twenty-eighth step. If the unit identification number is not equal to M, the control unit 45 adds one to the unit identification number at the twenty-ninth step and then repeats the thirtieth through either the thirty-third or the thirty-sixth steps and the twenty-eighth step. In this manner, the control unit 45 repeatedly refreshes the free channels in the free channel table 47 in connection with all microcellular stations 13 connected to the central base station 29. In the meantime, the allocated channel or channels are afresh used here and there in the microcells 11 with such allocated channels cancelled from the record in the free channel table 47. Each allocated channel is released in due course into a fresh free channel, which is detected by a certain one of the measuring units 40 when a concerned one of the microcellular base stations 13 is specified as the selected station BSj.

It is understood that each regular measuring unit 41 measures the interference signal level of each radio channel as the measured level described before substantially at a regular refresh interval predetermined by a cycle of repeated use thereof and that such measured levels are represented in the free channel table 47 by the free channels as regards the respective microcellular base stations 13. As for the additional measuring unit 43, the short refresh interval is obviously shorter than the regular refresh interval. It is additionally possible to understand that the channel count decreases with time for each of the microcellular base stations 13 to become less than a predetermined reference count. Such a microcellular base station is herein called a less-count base station. After lapse of the predetermined short refresh interval time, such less-count base stations include the above-mentioned one of the microcellular base stations 13 that is found at the thirty-fourth step. The short refresh interval is consequently decided so as not to refresh the free channels in the free channel table 47 only as regards one of the less-count base stations for which the channel count is maximum.

Figure 10:
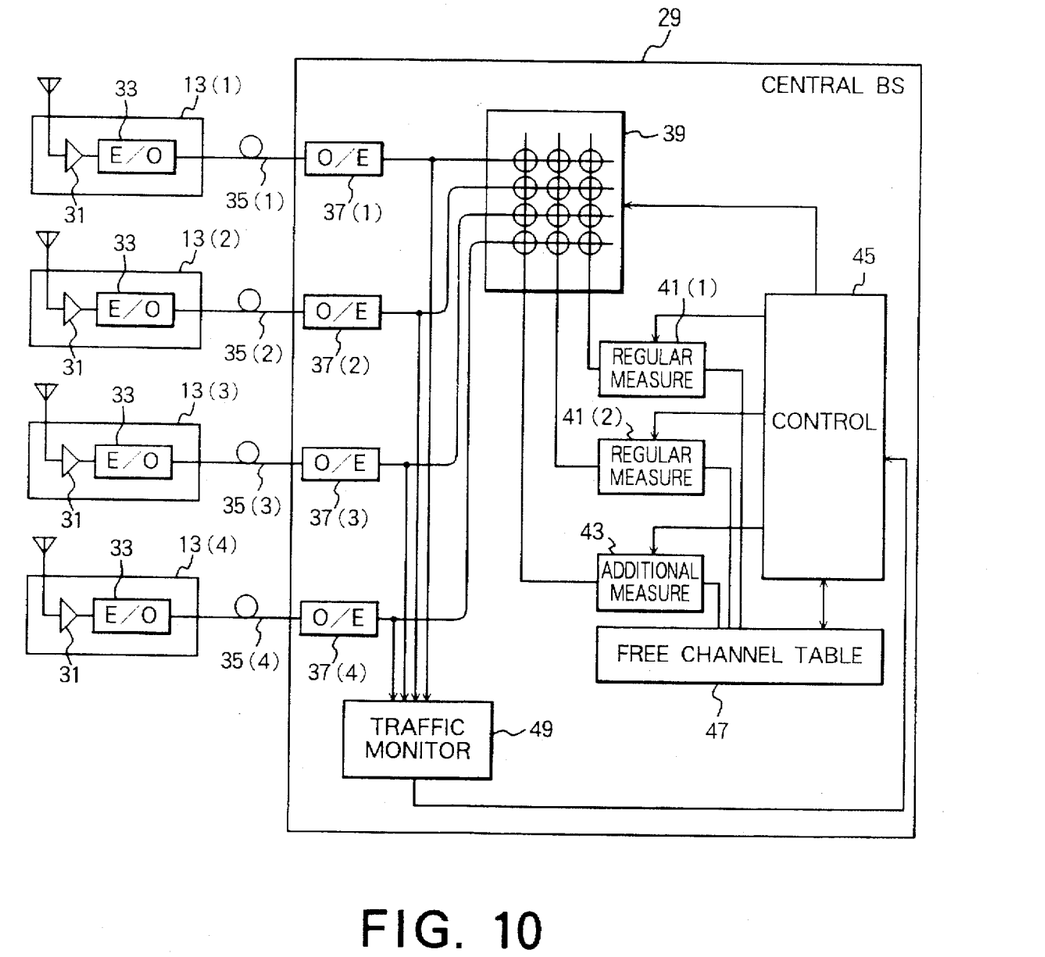
FIG. 10 shows in blocks a central base station according to a fifth embodiment of this invention together with several microcell base stations.

Referring to FIG. 10 with FIGS. 1 and 8 continuously referred to, attention will be directed to a central base station 29 according to a fifth preferred embodiment of this invention. In addition to the circuit elements described in conjunction with FIG. 8, a traffic monitor 49 is used to monitor traffic values of respective ones of connections between switch 39 and the first through the fourth opto-electric converters 37. In this manner, the traffic monitor 49 monitors the traffic value of each microcellular base station and consequently of the first and the N-th radio channels CH(1) to CH(N) except for those which can and may actually be reused in remote ones of the microcells 11. Connected to the traffic monitor 49, the control unit 45 calculates a traffic ratio in connection with each microcellular base station 13 by dividing the channel count by the traffic value.

Referring again to FIG. 9 with FIGS. 1, 8, and 10 continuously referred to, the control unit 45 is operable in cooperation with the traffic monitor 49 in a manner similar to that described above. At the thirty-fourth step S34, the control unit 45 decides the selected base station BSj as follows. First, the control unit 45 calculates an average traffic value by averaging station counts of those of the microcellular base stations 13 that have been in actual communication service during lapse of the predetermined short refresh interval of time. Subsequently, the control unit 45 calculates an average traffic ratio by dividing the channel count by the average traffic value. Finally, the control unit 45 decides the selected station BSj by finding one of the microcellular base stations 13 that has a minimum average traffic value among less-ratio base stations which correspond to the less-count base station described before.

FIGS. 8 and 10 will be reviewed with FIGS. 1 and 9 again referred to. As regards each microcellular base station 13, the free channels are selected In FIG. 8 by using not only at the regular refresh interval but also at the short refresh interval. For the less-count base station, the free channels are detected at the short refresh interval. Use of the measuring units 40 partly as the additional measuring unit or units 43 may decrement the regular measuring units 41 and accordingly lengthens the regular refresh interval for other stations other than the less-count base stations in the microcellular base stations 13, if the measuring units 40 are of a predetermined total number. It should, however, be noted in connection with the other stations that the free channels would not all be used as the allocated channels during this lengthened refresh interval. As a result, the call loss and the forced call interruption would seldom take place in the meanwhile. As for the lesscount base stations, the additional measuring unit or units 43 will very soon detect one of the radio channels CH(1) to CH(N) as the free channel that is released in the meantime. This reduces an adverse possibility of occurrence of the call loss and the forced call interruption. If a certain frequency of occurrence of the call loss and the forced call interruption is allowed, it is possible to reduce the predetermined total number.

When the predetermined total number of measuring units 40 are used, the call loss and the forced call interruption likely take place even in those of the microcellular base stations 13 which have a greater traffic value either because the free channels of the other stations may be all used during the regular or the short refresh interval or because the measuring units 40 do not detect as the free channel the allocated channel set free in the meanwhile. For these of the microcellular base stations 13 which have the greater traffic value or values, the traffic ratio is small even when a predetermined number of free channels are available as the allocated channel. It is therefore possible to prevent the adverse possibility by using operation described with reference to FIGS. 10 and 9.

While this invention has thus far been described in specific conjunction with several preferred embodiments thereof and a few modifications, it will now be readily possible for one skilled in the art to put this invention into practice in various other manners. For example, it is possible to use in FIGS. 8 through 10 a predetermined ratio of idle time slots in searching for the free channels at the short refresh interval. It is also possible to store not only the identification number either in the recorder 25 or in the free channel table 47 but also the measured levels for use in selection of the allocated channel. Moreover, it is readily possible in FIGS. 8 and 10 to add other circuit elements in the central base station 29 and to the microcellular base stations 13 for bidirectional transmission messages to and from the mobile stations 15.

What is claimed is:

1. A mobile communication system comprising a base station in each cell for communication with a mobile station in said cell through an allocated channel of a plurality of radio channels, said base station comprising measuring means for measuring an interference signal level of each channel as a measured level, storing means for storing said measured level as a stored level, and selecting means for selecting said allocated channel based on said stored level, wherein said measuring means is for measuring the interference signal level of one of said radio channels during a first predetermined interval as said measured level and for further measuring the interference signal level of said one of radio channels during a second predetermined interval when said stored level is lower than a predetermined reference level.

2. The mobile communication system as claimed in claim 1, wherein said measuring means does not further measure the interference signal level when said stored level is lower than a different reference level that is lower than said predetermined reference level.

3. A base station for use in each cell of a mobile communication system in transmitting a message to a mobile station present in said cell through an allocated channel of a plurality of radio channels, said base station comprising measuring means for measuring an interference signal level of each channel as a measured level, storing means for storing said measured level as a stored level, and selecting means for selecting said allocated channel based on said stored level, wherein said measuring means is for measuring the interference signal level of one of said radio channels during a first predetermined interval as said measured level and for further measuring the interference signal level of said one of radio channels during a second predetermined interval when said stored level is lower than a predetermined reference level.

4. The base station as claimed in claim 3, wherein said measuring means does not further measure the interference signal level when said stored level is lower than a different reference level that is lower than said predetermined reference level.

5. The base station as claimed in claim 4, wherein said measuring means comprises:

calculating means for calculating a number ratio of first channels to said plurality of radio channels, each of said first channels having said measured level lower than said predetermined reference level; and adjusting means for adjusting said predetermined reference level lower when said number ratio is greater than a predetermined ratio, and for adjusting said predetermined reference higher when said number ratio is lower than said predetermined reference and lower than a different ratio that is smaller than said predetermined ratio.

6. A mobile communication system comprising a base station in each cell for communication with a mobile station in said cell through an allocated channel of a plurality of radio channels, said base station comprising measuring means for measuring an interference signal level of each channel as a measured level, storing means for storing said measured level as a stored level, and selecting means for selecting said allocated channel based on said stored level, wherein said measuring means is for measuring said interference signal level at a refresh interval with said refresh interval given a short interval when said stored level is lower than a predetermined reference level.

7. A base station for use in each cell of a mobile communication system in transmitting a message to a mobile station present in said cell through an allocated channel of a plurality of radio channels, said base station comprising measuring means for measuring an interference signal level of each channel as a measured level, storing means for storing said measured level as a stored level, and channel selecting means for selecting said allocated channel based on said stored level, wherein said measuring means is for measuring said interference signal level at a refresh interval with said refresh interval given a short interval when said stored level is lower than a predetermined reference level.

8. The base station as claimed in claim 7, wherein said measuring means comprises:

a first measuring unit for measuring said interference signal level at a first refresh interval to produce said measured level;

a second measuring unit for measuring said interference signal level at a second refresh interval shorter than said first refresh interval to produce said measured level; and a measuring unit selecting unit for selecting said first and said second measuring units when said stored level is and is not lower than said predetermined reference level, respectively.

9. The base station as claimed in claim 8, wherein said measuring unit selecting unit calculates a channel count of queued channels, each of which is in a queue for measurement by said first measuring unit, and selects said second measuring unit regardless of a relation between said stored level and said predetermined reference level when said channel count is greater than a predetermined reference count.

10. The base station as claimed in claim 8, wherein said measuring unit selecting unit selects said second measuring unit when said stored level is higher than said predetermined reference level regardless of a channel count of queued channels each of which is in a queue for measurement by said first measuring unit.

11. The base station as claimed in claim 8, wherein said measuring unit selecting unit repeatedly selects said first measuring unit when said stored level is not higher than said predetermined reference level and furthermore when a predetermined reference count is not exceeded by a channel count of queued channels each of which is in a queue for measurement by said first measuring unit.

12. The base station as claimed in claim 8, wherein said measuring unit selecting unit gives a lower and a higher reference level to said predetermined reference level so as to keep, in a predetermined range, a channel count of queued channels each of which is in a queue for measurement by said first measuring unit.

13. The base station as claimed in claim 7, wherein said measuring means gives a lower and a higher reference level to said predetermined reference level when said interference signal level should be measured in said refresh interval and said short interval, respectively.

14. The base station as claimed in claim 7, wherein said channel selecting means suspends operation of said measuring means when said each channel is said allocated channel.

15. A mobile communication system comprising a central base station and a plurality of microcell base stations placed in respective microcells and connected to said central base station through transmission paths, one microcell base station in each microcell being for communication with a mobile station in said each microcell through an allocated channel of a plurality of radio channels, wherein said central base station comprises:

regular measuring means for measuring an interference signal level of each radio channel as a measured level at a regular refresh interval;

storing means for storing said measured level as a stored level;

control means for calculating, in connection with each microcell base station, a channel count of free channels for each of which said stored level is lower than a predetermined reference level; and additional measuring means for measuring the interference signal level of each radio channel additionally as said measured level at a short refresh interval shorter than said regular refresh interval in connection with each less-count base station of said microcell base stations, the channel count of said less-count base station being less than a predetermined reference count;

said control means selecting said allocated channel based on the stored level which includes the stored level stored in response to the measured level measured additionally by said additional measuring means.

16. A central base station for use in a mobile communication system comprising a plurality of microcell base stations placed in respective microcells and connected to said central base station through transmission paths, one microcell base station in each microcell being for communication with a mobile station in said each microcell through an allocated channel of a plurality of radio channels, wherein said central base station comprises;

regular measuring means for measuring an interference signal level of each radio channel as a measured level at a regular refresh interval;

storing means for storing said measured level as a stored level;

control means for calculating, in connection with said microcell base station, a channel count of free channels for each of which said stored level is lower than a predetermined reference level; and additional measuring means for measuring the interference signal level of said radio channel additionally as said measured level at a short refresh interval shorter than said regular refresh interval in connection with each less-count base station of said microcell base stations, the channel count of said less-count base station being less than a predetermined reference count;

said control means selecting said allocated channel based on the stored level which includes the stored level stored in response to the measured level measured additionally by said additional measuring means.

17. A mobile communication system comprising a central base station and a plurality of microcell base stations placed in respective microcells and connected to said central base station through transmission paths, one microcell base station in each microcell being for communication with a mobile station in said each microcell through an allocated channel of a plurality of radio channels, wherein said central base station comprises:

regular measuring means for measuring an interference signal level of each radio channel as a measured level at a regular refresh interval;

storing means for storing said measured level as a stored level;

control means for calculating, in connection with each microcell base station, a channel count of free channels, for each of which said stored level is lower than a predetermined reference level, a traffic value of said radio channels, and a traffic ratio of said channel count to said traffic value; and additional measuring means for measuring the interference signal level of each radio channel additionally as said measured level at a short refresh interval shorter than said regular refresh interval in connection with each less-ratio base station of said microcell base stations, the traffic ratio of said less-ratio base station being less than a predetermined reference ratio;

said control means selecting said allocated channel based on the stored level which includes the stored level stored in response to the measured level measured additionally by said additional measuring means.

18. A central base station for use in a mobile communication system comprising a plurality of microcell base stations placed in respective microcells and connected to said central base station through transmission paths, one microcell base station in each microcell being for communication with a mobile station in said each microcell through an allocated channel of a plurality of radio channels, wherein said central base station comprises:

regular measuring means for measuring an interference signal level of each radio channel as a measured level at a regular refresh interval;

storing means for storing said measured level as a stored level;

control means for calculating, in connection with each microcell base station, a channel count of free channels, for each of which said stored level is lower than a predetermined reference level, a traffic value of said radio channels, and a traffic ratio of said channel count to said traffic value; and additional measuring means for measuring the interference signal level of each radio channel additionally as said measured level at a short refresh interval shorter than said regular refresh interval in connection with each less-ratio base station of said microcell base stations, said traffic ratio of said less-ratio base station being less than a predetermined reference ratio;

said control means selecting said allocated channel based on the stored level which includes the stored level stored In response to the measured level measured additionally by said additional measuring means.

19. The central base station as claimed in claim 18, wherein said control means comprises:

a traffic monitor for monitoring said transmission paths to detect said traffic value; and a control unit for calculating said channel count and said traffic ratio and for selecting said allocated channel based on the stored level which includes the stored level stored in response to the measured level measured additionally by said additional measuring means.

* * * * *